No. 727,231. PATENTED MAY 5, 1903.
R. J. URQUHART.
MOTOR VEHICLE.
APPLICATION FILED FEB. 17, 1903.
NO MODEL.
FIG. 1.
FIG. 2.
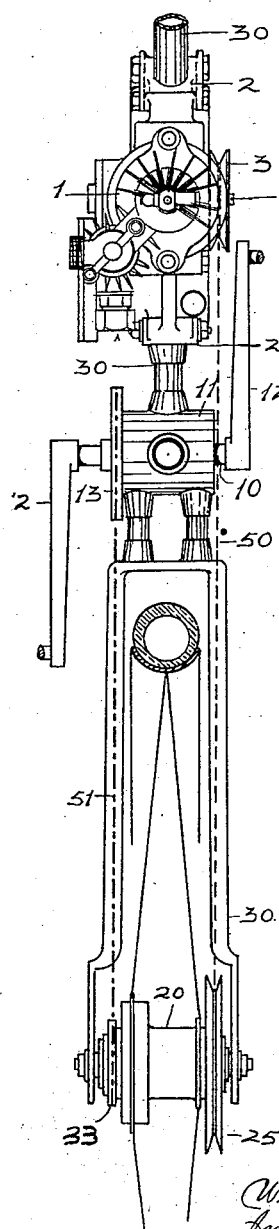
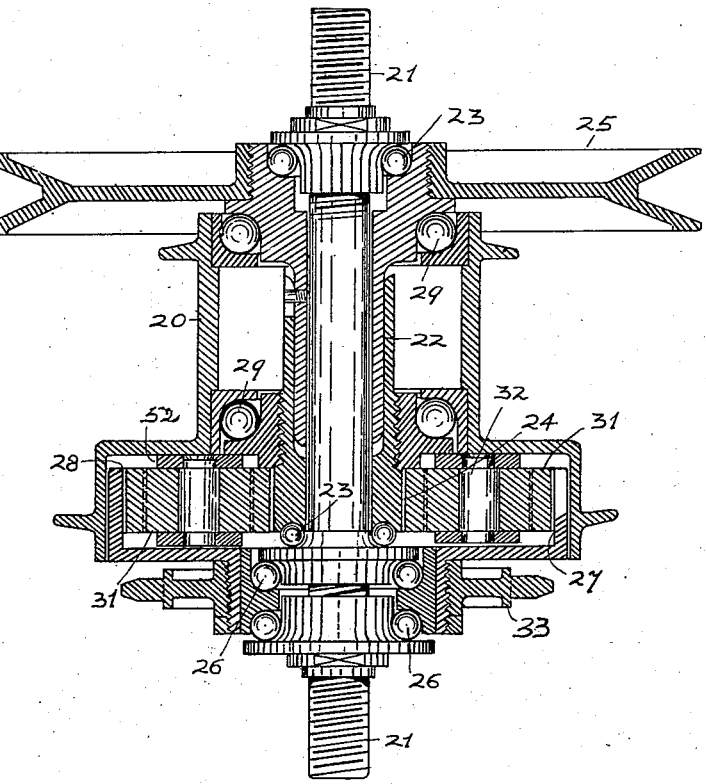
Witnesses.
Inventor
Ridley J. Urquhart.
By Edward P. Thompson Atty.

No. 727,231. Patented May 5, 1903.

UNITED STATES PATENT OFFICE.

RIDLEY JAMES URQUHART, OF LIVERPOOL, ENGLAND.

MOTOR-VEHICLE.

SPECIFICATION forming part of Letters Patent No. 727,231, dated May 5, 1903.

Application filed February 17, 1903. Serial No. 143,777. (No model.)

*To all whom it may concern:*

Be it known that I, RIDLEY JAMES URQUHART, a subject of the King of Great Britain and Ireland, and a resident of Liverpool, in the county of Lancaster, England, have invented new and useful Improvements in Motor-Vehicles, of which the following is a specification.

This invention relates chiefly to light vehicles adapted to be propelled by cranks or like mechanism actuated by the rider—such as bicycles, tricycles, and quadricycles—to which high-speed motors—such, for instance, as internal-combustion motors—are applied to drive or to assist to drive the vehicle.

The object of this invention is to provide an efficient method of gearing by which the motor or the rider can do all or part of the work of driving, as desired, and so that a vehicle can be fitted with as small a motor as possible, having regard to the power required and to the proportion thereof which the rider can apply.

The invention is shown applied to a bicycle only for the sake of simplicity.

It consists in the method of applying a differential or compensating gear so that the motion of the motor and that of the pedal-cranks can be either jointly or alternately independently transmitted to the road-wheel without appreciable loss of energy.

In the drawings attached hereunto, Figure 1 represents a plan, partly in section, of the invention applied to a bicycle. Fig. 2 represents an enlarged view of the driving-gear fitted on the hub of the wheel.

The arrangement illustrated is designed so that when either the motor or the pedal crank-axle alone is driving or both are driving together the vehicle will go forward, and the vehicle runs fastest when both are driving forward together, concurrent back pedaling tending to reduce the speed of the machine. When both the motor and pedal-cranks are driving, my invention acts as a compensating gear, and the sum of the motions communicated by the motor and the pedals is transmitted to the road-wheel. On back pedaling the device acts as a differential gear, and the difference between the two said motions is transmitted to the road-wheel, while when either the motor or pedal-shaft is stationary the other drives alone and independently.

In the drawings, 1 represents the motor; 10, the pedal crank-axle; 20, the hub of the driving-wheel.

The motor 1 is shown bolted to the framework 30 of the machine by means of the clips 2. An internal-combustion motor is shown on the drawings.

3 represents the motor transmission-wheel fixed to the crank-shaft of the motor, the end 4 of said shaft being preferably adapted to be turned by a detachable handle (not shown) for starting the motor.

The pedal-crank-axle bearing 11 carries the crank-axle 10 in ball-bearings in the usual way. The axle 10 has the usual pedal-cranks 12. Upon the axle 10 is a sprocket-wheel 13, preferably upon the end of said axle farthest away from the transmission-wheel 3.

The hub 20 of the driving road-wheel is fitted with an epicyclic differential gear adapted so that the three principal rotary elements can rotate at the same time. The central axle 21 is preferably a stationary one and fixed at its ends to the frame 30 of the machine. A sleeve 22, preferably in two parts and adapted to telescope one into the other, mounted upon ball-bearings 23, carries at one end the central spur-pinion 24 and at the other end a transmission-wheel 25 to correspond and in line with the said transmission-wheel 3 of the motor. The spur-pinion 24 forms the central or sun wheel of the epicyclic gear. Freely rotatable upon the stationary axle 21 and mounted upon the ball-bearings 26 is an internally-toothed annular wheel 27, having its teeth 28 facing those of the said spur-pinion 24. Upon the boss of the wheel 27 is fixed a sprocket-wheel 33 in line with the said sprocket-wheel 13. The hub of the driving road-wheel is mounted, by means of the ball-bearings 29, upon the sleeve 22 and is fixed to the planet-wheel rotary carrier 52 of the epicyclic gear. Pinions 31 are carried by the said rotary carrier 52, so as to rotate freely upon their bearings 32, and are proportioned so as to mesh with the said central pinion 24 and the internally-toothed annular wheel 27. The said transmission-wheels 3 and 25 are geared or coupled together, preferably by the belt 50. The sprocket-wheels 13 and 33 are geared or coupled together by means of the endless chain 51.

I do not confine myself to the particular relative arrangement of motor pedals and hub described and illustrated.

With a more powerful motor than it is the object of this invention to employ it may be necessary to have a brake applied to the wheel 27, operated by the pedals or a hand-lever. As the application of such a brake is well known in the art, it is not shown in the drawings or further described in the specification.

What I claim as my invention, and desire to secure by Letters Patent, is—

1. A driving-gear for vehicles consisting of the combination of two axially-alined driving gear-wheels, a hub axially alined with said gear-wheels, planet-wheels fixed on said hub, each of the said planet-wheels engaging with both of the said gear-wheels, a motor, said motor being operatively connected to one of said gear-wheels, and pedal-cranks, said cranks being operatively connected to the other of said gear-wheels.

2. A driving-gear for vehicles consisting of the combination of two axially-alined rotary elements, a driving gear-wheel secured to each of the said elements, a road-wheel, a hub for said road-wheel axially alined with said elements, a planet-wheel carrier fixed on said hub, planet-wheels mounted on said carrier, each of the said planet-wheels engaging with both of the said gear-wheels, a frame for the vehicle, a motor secured on said frame, said motor being operatively connected to one of said elements, and pedal-cranks mounted on said frame, said cranks being operatively connected to the other of said elements.

3. A driving-gear for vehicles consisting of the combination of a stationary shaft, a rotary sleeve mounted on said shaft, a spur-pinion on one end of said sleeve, a pulley-wheel secured on the other end of said sleeve, an internal rotary gear-wheel also mounted on said shaft, a boss on said gear-wheel, a sprocket-wheel secured on said boss, a rotary hub mounted on said sleeve, a carrier fixed to said hub, planet-wheels mounted on said carrier, each of the said planet-wheels meshing with said pinion and with said gear-wheel, a frame for the vehicle, a motor secured on said frame, a pulley-wheel for said motor, a belt connecting the said two pulleys, a crank-shaft mounted on said frame, pedal-cranks secured on said crank-shaft, a sprocket-wheel fixed on said crank-shaft, and a chain connecting the said two sprocket-wheels.

4. A driving-gear for vehicles consisting of the combination of a stationary shaft, a rotary sleeve mounted on said shaft, a spur-pinion on one end of said sleeve, a pulley-wheel secured on the other end of said sleeve, an internal rotary gear-wheel also mounted on said shaft, a boss on said gear-wheel, a sprocket-wheel secured on said boss, a rotary hub mounted on said sleeve, a carrier fixed to said hub, planet-wheels mounted on said carrier, each of the said planet-wheels meshing with said pinion and with said gear-wheel, a frame for the vehicle, a motor secured on said frame, said motor being operatively connected to said pulley-wheel, and pedal-cranks mounted on said frame, said cranks being operatively connected to said sprocket-wheel.

5. A driving-gear for vehicles consisting of the combination of a stationary shaft, a rotary sleeve mounted on said shaft, a spur-pinion on said sleeve, an internal rotary gear-wheel also mounted on said shaft, a boss on said gear-wheel, a rotary hub mounted on said sleeve, a carrier fixed on said hub, planet-wheels mounted on said carrier, each of the said planet-wheels meshing with said pinion and with said gear-wheel, a motor operatively connected to said sleeve, and pedal-cranks operatively connected to said boss.

6. A driving-gear for vehicles consisting of the combination of a stationary shaft, a spur-pinion and an internal gear-wheel and a rotary hub mounted on said shaft, planet-wheels mounted on said hub, each of the said planet-wheels meshing with said pinion and with said gear-wheel, a motor operatively connected to said pinion, and pedal-cranks operatively connected to said gear-wheel.

7. In a driving-gear for vehicles, the combination of a driven member, a compensating gear, equalizing-pinions for said gear, said pinions being fulcrumed on said member, two gear-wheels, both of said gear-wheels engaging each of said pinions on opposite sides of its fulcrum, a motor operatively connected to one of said gear-wheels, and a manual-power device operatively connected to the other of said gear-wheels.

8. In a driving-gear for vehicles, the combination of a rotary hub, a motor, a manual-power device, an equalizing-pinion fulcrumed on said hub at a distance from the center thereof, a set of reducing-gears operatively connecting said motor to said pinion at one side of said fulcrum, and a set of multiplying-gears operatively connecting said manual-power device to said pinion at the opposite side of said fulcrum.

In testimony whereof I have signed my name to this specification in the presence of two subscribing witnesses.

RIDLEY JAMES URQUHART.

Witnesses:
DAVID S. MILLIGAN,
WILLIAM H. BROAD.